June 5, 1923. 1,458,075
C. P. POND
TOP FOR VEHICLE BODIES
Filed Sept. 13, 1921 3 Sheets-Sheet 1

WITNESSES
INVENTOR
CHARLES P. POND
BY
ATTORNEYS

June 5, 1923.
C. P. POND
TOP FOR VEHICLE BODIES
Filed Sept. 13, 1921
1,458,075
3 Sheets-Sheet 2
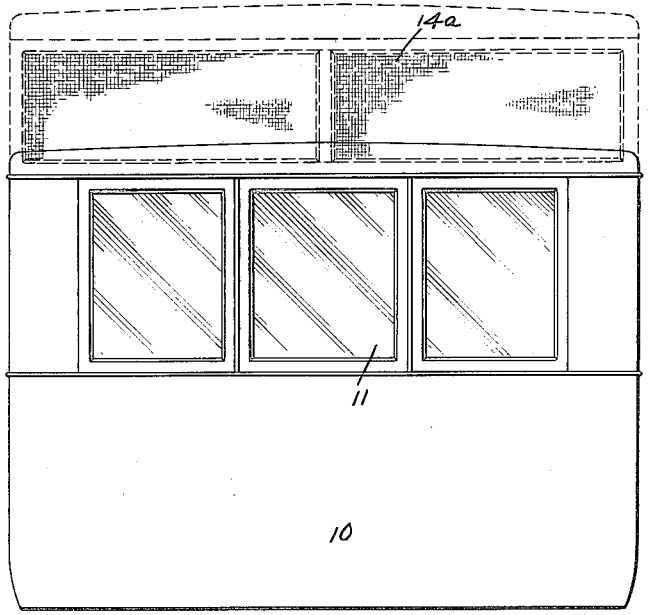
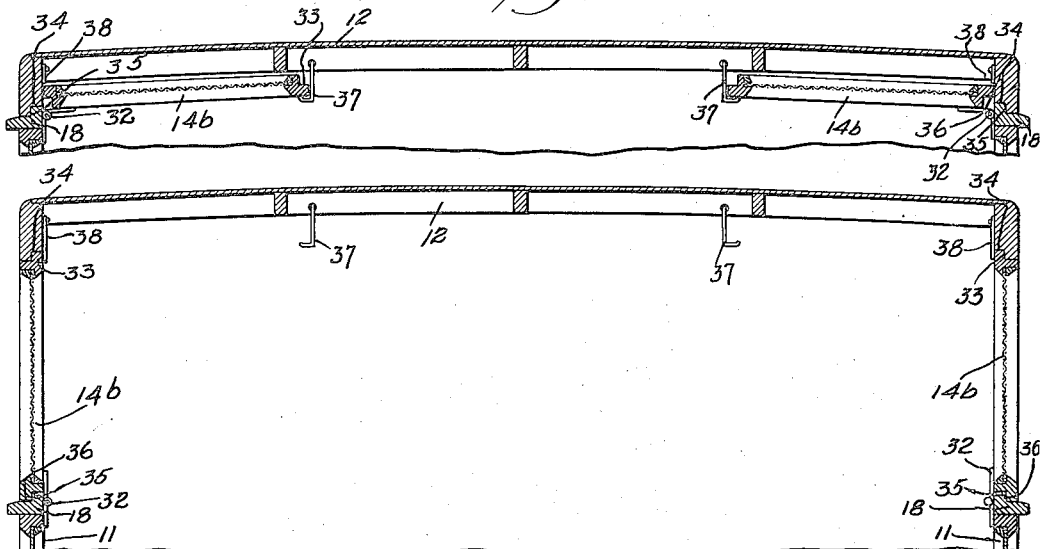
WITNESSES
INVENTOR
BY Charles P. Pond
ATTORNEYS

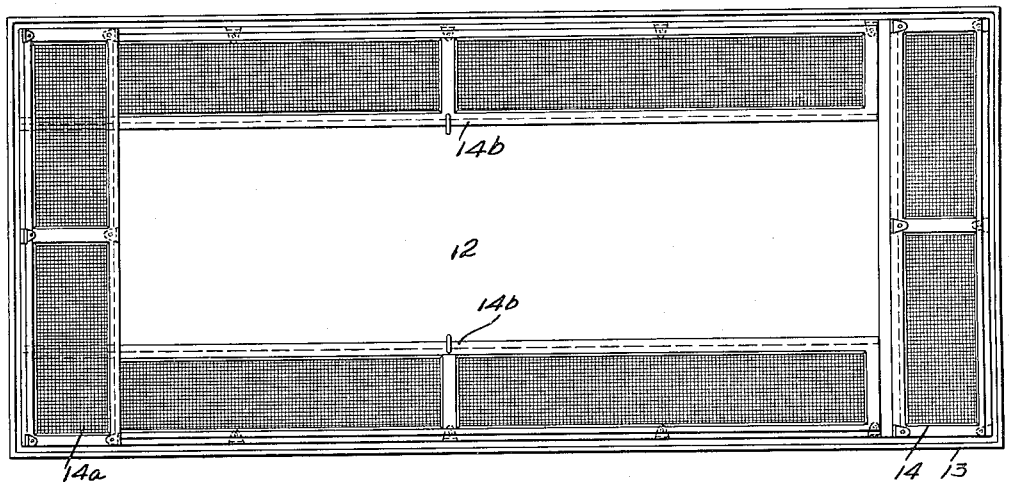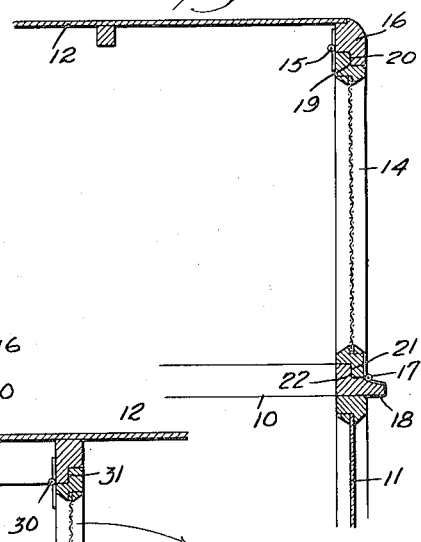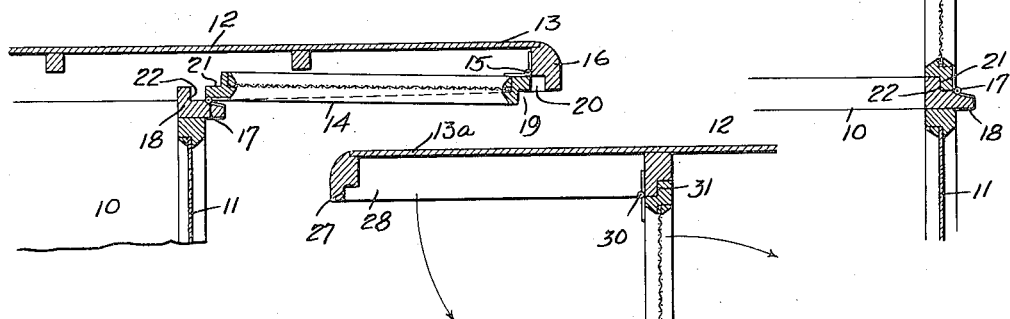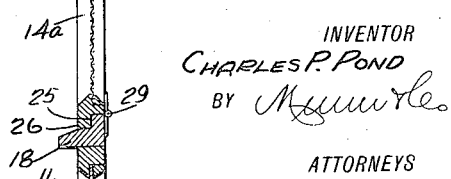

Patented June 5, 1923.

1,458,075

UNITED STATES PATENT OFFICE.

CHARLES P. POND, OF CAMDEN, NEW YORK, ASSIGNOR OF ONE-HALF TO GEORGE L. TRAFFARN, OF CAMDEN, NEW YORK.

TOP FOR VEHICLE BODIES.

Application filed September 13, 1921. Serial No. 500,366.

*To all whom it may concern:*

Be it known that I, CHARLES P. POND, a citizen of the United States, and a resident of Camden, in the county of Oneida and State of New York, have invented a new and Improved Top for Vehicle Bodies, of which the following is a description.

My invention relates to a roofed extension top for vehicle bodies, the invention being more particularly intended for embodiment in auto busses, auto bungalows, auto houses, or house cars.

The general object of my invention is to provide an improved top adapted to be mounted on a vehicle body and comprising a roof, together with panels, hinged to fold for sustaining the roof in a raised position above the vehicle body for making the vehicle body more available for living purposes or to cause the roof to lower onto the vehicle body for traveling or entering a garage, barn, or other building having doors of normal height, or for readily passing under bridges, trees, etc., which is not possible with a full height of auto houses or house cars.

A further advantage in lowering the roof under certain conditions when traveling is that the center of gravity is lower than in the ordinary auto bungalows or the like, so that rolling is greatly lessened.

The nature of the invention, its distinctive features and advantages will clearly appear as the description proceeds.

Reference is to be had to the accompanying drawings forming a part of this specification, it being understood that the drawings are merely illustrative of one example of the invention.

Figure 3 is a rear end view of a vehicle body and indicating in dotted lines my improved extension top thereon;

Figure 4 is a detail in transverse vertical section of the folded or collapsed roof showing a portion of the upper edge of the body;

Figure 5 is a view similar to Figure 4 but with the roof and panels raised;

Figure 6 is an inverted plan view of my improved roof and panels, the latter in the folded or collapsed positions;

Figure 7 is a detail in vertical section at the front of the roof and body, the roof being lowered;

Figure 8 is a detail in vertical section of the same features as in Figure 7 but with the roof in the raised position;

Figure 9 is a detail in vertical section of the rear portion of the raised roof and the rear supporting panel, a fragment of the body being shown.

Figure 1:
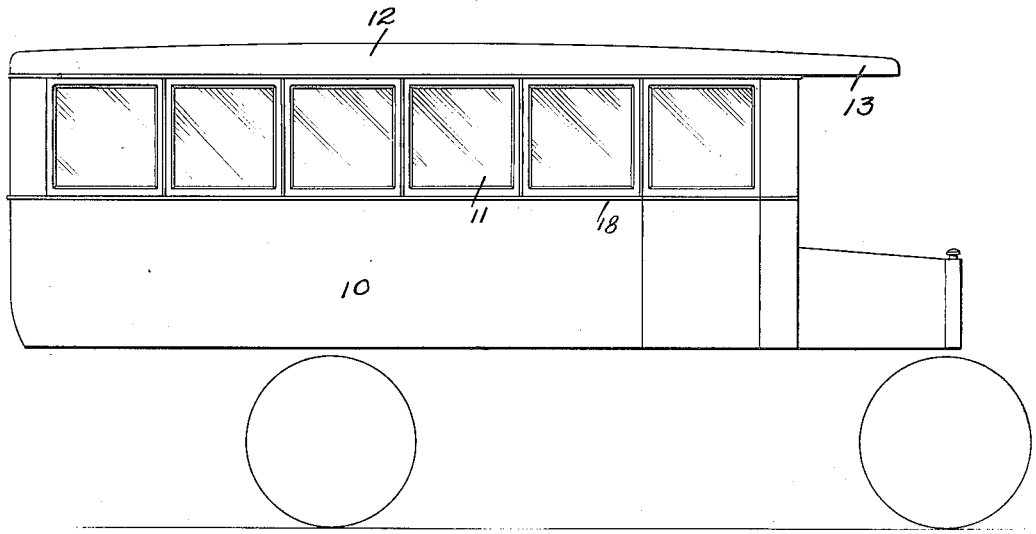
Figure 1 is a side elevation largely diagrammatic of an auto vehicle equipped with my improved extension top, the latter being shown in the lowered position.
Figure 2:
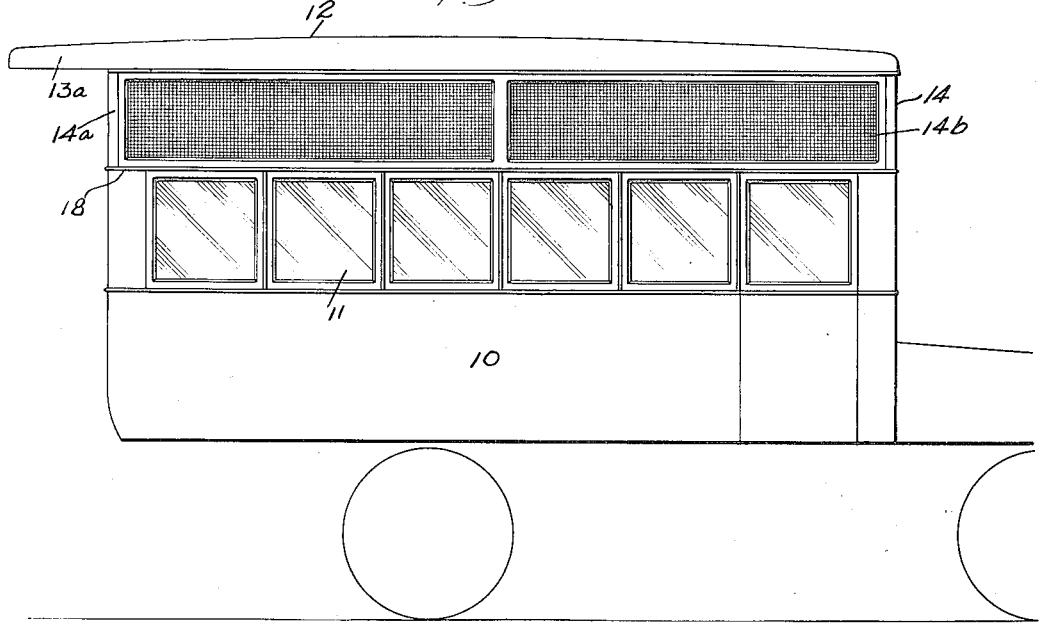
Figure 2 is a view similar to Figure 1 with the roof and panels in the raised position.

In carrying out my invention in practice the body 10 of the vehicle is formed with an opening provided with the usual windows 11. My improved roof 12 is placed above the open top of the bottom to lie directly on the latter or to be raised above the same to constitute a vertical extension on the body to thereby increase the height thereof. The roof 12 has a length greater than the body so that in the lowered position it extends at the front end beyond the body as indicated at 13 while in the raised position of the roof as in Figure 2, said roof extends rearwardly beyond the body.

Associated with the roof 12 is a front transverse panel 14 secured at its upper end by a hinge 15 to the front cross bar 16 of the roof frame at the inner side of the latter and secured at its lower edge by a hinge 17 to the top frame 18 of the body 10. At the upper edge of the panel 14 is a gain or rabbet 19 conforming to a similar formation 20 at the lower edge of the roof frame member 16, the arrangement being such that as the roof is raised the panel 14 will swing into the plane of the roof frame member 16 forming an overlapped joint therewith. Similarly, at the lower edge the frame of the panel 14 has a gain or rabbet 21 and the top frame 18 of the body has a corresponding rabbet 22.

A transverse panel 14ᵃ corresponding with the panel 14 is provided at the rear of the body and is rabbeted at its lower edge as at 25, thereby forming a frame member 26 of reduced thickness which is adapted, when the roof 12 is lowered, to be accommodated in a rabbet 27 in a frame 28 provided on the roof 12 at the rear end. The panel 14ᵃ is secured at its lower edge by a hinge 29 to the top frame 18 of the body and said frame 18 has a formation to mate the rabbet 25 of said panel. At the upper edge the panel 14ᵃ is secured by a hinge 30 to the frame 28. The upper edge of the frame of the panel 14ᵃ and the adjacent edge of the frame 28 have a mating rabbeted formation as at 31.

With the above described arrangement the roof 12 may be raised and the panels 14, 14ᵃ disposed vertically beneath said roof between the roof and top frame 18 of the body. Or, the roof may be lowered by causing the panels 14, 14ᵃ to move on their hinges, thereby lowering the roof with a parallel movement onto the body frame 18.

In addition to the front and rear panels 14, 14ᵃ, I provide side panels 14ᵇ ranging longitudinally of the vehicle roof 12. In the illustrated arrangement of the side panels 14ᵇ the lower edge is secured by a hinge 32 to the body frame 18 so that the said panels may be swung to a vertical position beneath the roof and engage in the frame of roof 12, or swung free of the roof but disposed parallel therewith at the under side thereof as in Figure 4. The upper edge of a panel 14ᵇ has a rabbet 33 mating a corresponding rabbet 34 on the frame of roof 12. The lower edge of each panel 14ᵇ may be formed in any suitable manner to mate the frame 18. In the illustrated form the frame 18 at each side has a rabbet 35 to conform to the rabbeted formation 36 at the lower edge of a side panel 14ᵇ when the roof is raised and said side panel is upright beneath the roof. I have indicated hooks 37 on the roof 12 as a means to hold the side panels 14ᵇ when said roof is lowered; as well as swingable latch plates 38 on the frame of roof 12 to retain the free edges of the side panels when the roof is raised and the side panels swung to the upright position.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A vehicle body open at the top, a separate roof therefor, transversely disposed supports for the front and rear ends of the roof, said supports being permanently hinged at their lower ends to said body and at their upper ends to said roof for permitting a parallel longitudinal raising and lowering movement of said roof; and additional supports beneath the roof along the sides, said additional supports being hinged at one longitudinal edge and free at the opposite longitudinal edge, to swing to a folded position beneath the lowered roof or to upright positions to support the roof.

2. A vehicle body having an open top, a separate roof therefor, roof supports extending transversely at the front and rear ends of the roof, said supports being hinged both to the roof and body and swingable to or from a perpendicular position, said supports carrying the roof from a lower to a higher elevation or vice versa, and additional supports for the roof along the sides thereof also swingable to or from a perpendicular position, said last mentioned supports being hinged to the body and when in the vertical position form a continuation of the sides of the body.

3. A vehicle body having an open top, a separate roof therefor longer than said body, and foldable means to carry the roof with a parallel movement to a lowered position extending at its front end beyond the front of the body or to a raised position with its rear end extending beyond the rear end of the body.

4. A roof adapted to be mounted on a vehicle body to form an extension of its vertical dimension, rigid supporting means hingedly connected to said roof at the front and rear ends and having means to hingedly connect at their lower ends with the body, said supports being swingable to carry the roof to a raised or lowered position by a parallel longitudinal movement of said roof

CHAS. P. POND.